G. H. BUNNELL AND B. E. TITUS.
VULCANIZER.
APPLICATION FILED APR. 11, 1921.
1,393,495.
Patented Oct. 11, 1921.
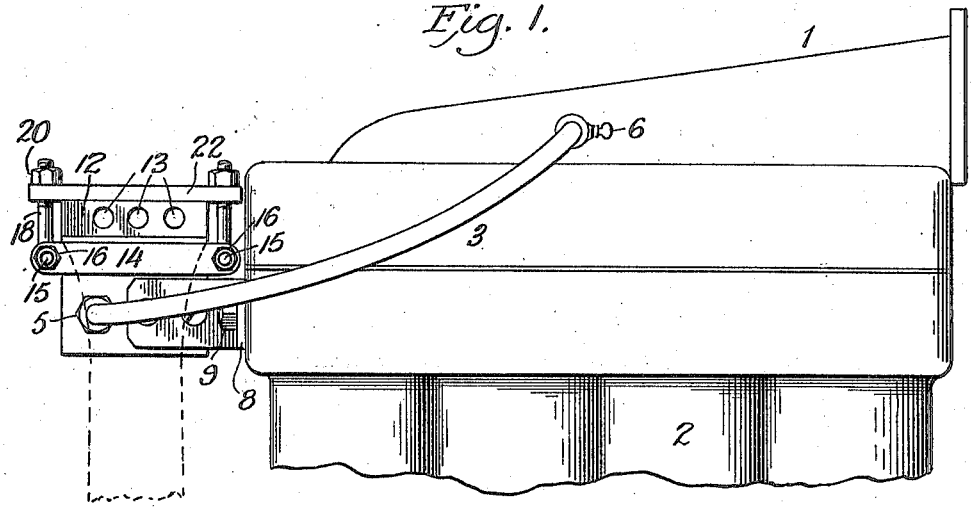
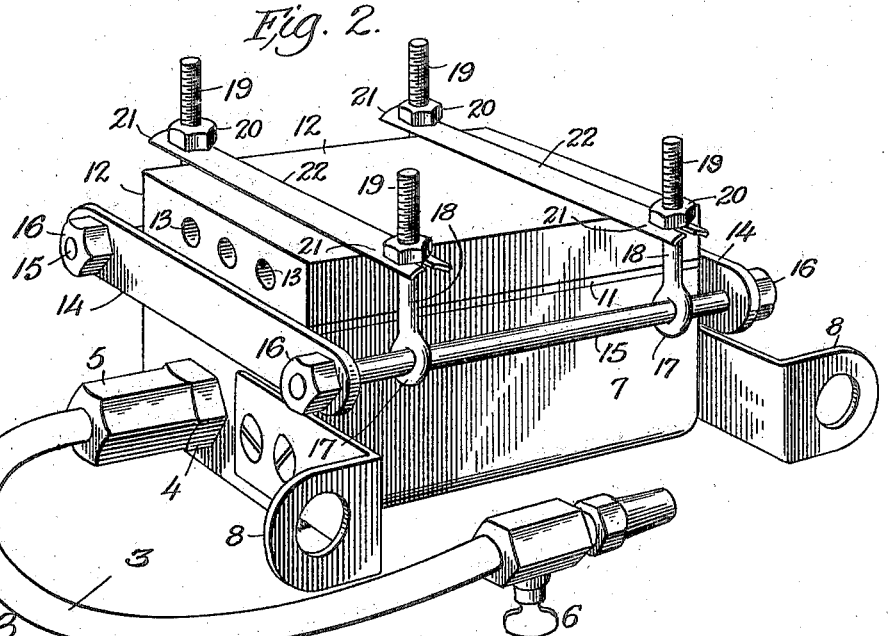
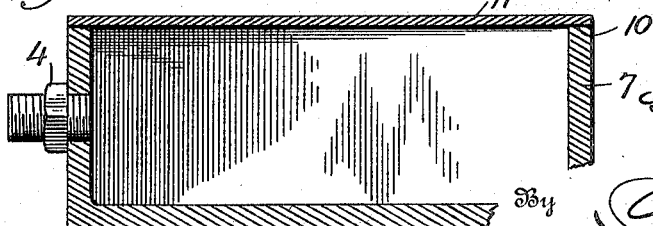
Inventors:
George H. Bunnell,
Bliss E. Titus
By Wm J. Moore
Attorney

UNITED STATES PATENT OFFICE.

GEORGE H. BUNNELL AND BLISS E. TITUS, OF MIDWAY, UTAH.

VULCANIZER.

1,393,495.  Specification of Letters Patent.  Patented Oct. 11, 1921.

Application filed April 11, 1921. Serial No. 460,180.

*To all whom it may concern:*

Be it known that we, GEORGE H. BUNNELL and BLISS E. TITUS, residents of Midway, in the county of Wasatch and State of Utah, citizens of the United States, have invented certain new and useful Improvements in Vulcanizers, of which the following is a specification.

Our invention relates to improvements in vulcanizers and refers particularly to a vulcanizer for use in repairing punctures in tires, the main object being the provision of a machine which will occupy a very small space and permit of application direct to the engine of the automobile to use the exhaust from the manifold in the operation of vulcanizing.

Another object of our invention is the provision of a vulcanizer of the character stated which will permit of instant application of the tire and operation thereon for purpose of repair, and thereby perform the operation of vulcanizing in a rapid, inexpensive and thoroughly efficient manner.

Another object of our invention is the production of a vulcanizer which will be the embodiment of simplicity, durability and inexpensiveness, and which from every point of view will be thoroughly practical and reliable.

With the attainment of the objects stated and such others as belong to an invention of this type, our improvement consists of a vulcanizer embodying novel features of construction and combination of parts substantially as shown, described and particularly defined by the claims.

Attention is invited to the accompanying drawing for a more complete understanding of the construction in detail and the operation of our vulcanizer, and in said drawing:

Figure 1 is a side elevation of a portion of an automobile engine showing our vulcanizer applied thereto, with a tire in position to be operated upon, said tire being shown in dotted lines.

Fig. 2 is a perspective view of the complete vulcanizer shown on an enlarged scale to more clearly illustrate its structural features, and Fig. 3 is a sectional view through the heating chamber and the plate or cover therefor.

Our vulcanizer, while capable of use for any character of work where it would prove efficient is particularly desirable for vulcanizing automobile tires, and is adapted for use in connection with the exhaust 1, of the automobile engine or motor 2, a pipe 3, through the medium of a nipple 4, and a connection 5, said pipe being provided with a cut-off valve or cock 6, forming the medium for supplying heat to the metal vulcanizing chamber or casing 7, such casing being rigidly connected to the engine by means of angle bracket 8, and suitable fastening means 9, as most clearly shown in Fig. 1.

From this construction it will be observed that the vulcanizer as a whole is rigidly mounted upon the engine in position to receive the heat through its connection with the exhaust directly to the vulcanizing chamber, the cock 6 regulating the supply of heat, while mounted upon the open top 10 of the chamber or casing is the aluminum top or plate 11, while resting upon said aluminum plate is the block 12, preferably made of wood and provided with cooling or ventilating passages 13, and in operation the tire is placed between the plate 11 and block 12, and subjected to the heat directly from the plate.

From this construction it will be evident that the tire being placed between the said plate 11 and block 12, the operation of vulcanizing is readily performed in a thoroughly efficient manner and for the purpose of clamping the tire in position to be operated upon, we provide a novel form of clamping or securing means which comprises the pair of plates or bars 14 disposed at each end of the vulcanizing chamber, the pair of rods 15, connecting said bars and clamping them in position through the medium of clamping nuts 16, while mounted upon said rods 15 are the eyes 17, of the swinging bolts 18, whose upper threaded ends 19 are engaged by nuts 20, such nuts bearing upon the ends 21, of the curved elastic plates or members 22, which causes the block 12 to be forced down upon the tire with exactly the firmness and pressure desired to properly perform the operation of vulcanizing.

It will be apparent that we provide a vulcanizer which can be applied to the engine of the automobile and not in the least interfere with the functioning of the engine and which will occupy a very small amount of space, also that the vulcanizer will perform its work quickly and thoroughly and that the article as a whole will be inexpensive, durable and practical from every important angle, and will commend itself to motorists and others skilled in machines of this character.

We claim:

1. In a vulcanizer, the combination with the exhaust of an engine, a pipe communicating therewith at one end, a vulcanizer secured rigidly to the engine and having its vulcanizing chamber communicating with the other end of said pipe, a plate fitting upon said vulcanizing chamber, a clamping block above said plate, a clamping frame for securing said block in position, and a valve or cock in said pipe for controlling the heat to said vulcanizing chamber.

2. In a vulcanizer, the combination with the exhaust of an engine, a pipe communicating therewith at one end, a vulcanizer secured rigidly to the engine and having its vulcanizing chamber communicating with the other end of said pipe, a block mounted on said vulcanizing chamber, and a clamping frame for securing said block in position with reference to the tire and vulcanizing chamber, said clamping frame consisting of a pair of plates, a pair of adjustable rods connecting said plates, adjusting bolts and nuts for said rods and spring plates resting on the block and engaged by said adjusting bolts and nuts.

3. A vulcanizer of the character described, consisting of a vulcanizing chamber, a top plate closing the upper open portion of said chamber, a clamping block fitting upon said plate and between which and said plate the tire is placed, and a clamping frame for securing the block in clamped position.

4. A vulcanizer of the character described, consisting of a vulcanizing chamber, a top plate closing the upper open portion of said chamber, a clamping block fitting upon said plate and between which and the plate the tire is secured, and a clamping frame for securing the block in clamped position, said frame consisting of a pair of plates clamped to the vulcanizing chamber, a pair of adjustable rods connecting said plates, two sets of adjusting bolts mounted upon said rods, adjusting nuts engaging said rods, and a pair of curved spring plates bearing upon the clamping block and operated upon by said adjusting bolts.

In testimony whereof we hereunto affix our signatures.

GEORGE H. BUNNELL.
BLISS E. TITUS.